DETECTOR FOR NTSC COLOR RECEIVER

Filed Feb. 21, 1955 5 Sheets-Sheet 1

INVENTOR
Charles H. Jones.
BY F. E. Browder
ATTORNEY

July 28, 1959 C. H. JONES 2,897,261

DETECTOR FOR NTSC COLOR RECEIVER

Filed Feb. 21, 1955 5 Sheets-Sheet 3

July 28, 1959 C. H. JONES 2,897,261

DETECTOR FOR NTSC COLOR RECEIVER

Filed Feb. 21, 1955 5 Sheets-Sheet 4

United States Patent Office 2,897,261

Patented July 28, 1959

2,897,261

DETECTOR FOR NTSC COLOR RECEIVER

Charles H. Jones, Pittsburgh, Pa., assignor to Westinghouse Electric Corporation, East Pittsburgh, Pa., a corporation of Pennsylvania Application February 21, 1955, Serial No. 489,585

31 Claims. (Cl. 178—5.4)

This invention relates to color television receivers, and has as objects to simplify such receivers and to reduce their manufacturing cost.

In conventional color television receivers, a brightness signal and three color signals are derived. This requires two or three color demodulators and matrixing circuits.

This invention provides detection circuits for color television receivers in which no color demodulators and no matrixing circuits are required. The color tubes used can be of any type in which color switching can be applied in such a manner as to give a smooth variation in hue as a function of time. Such a tube would present blue, cyan, green, yellow, red, purple, blue, cyan and so on. For example, in the time interval between yellow and red, the hues presented would be yellow, orange-yellow, yellow-orange, orange, red-orange, orange-red and red. Such tubes could be of the dot sequential type having closely spaced phosphor strips or lines arranged in the order: red, green, blue, red, green, blue and so on.

In a receiver for receiving National Television System Committee color signals, the 3.58 megacycle reference burst is used to synchronize a 3.58 megacycle local oscillator. Following this oscillator is a phase shift circuit which is adjustable for enabling an observer viewing the color picture, to adjust the hue of the picture. The output of the phase shift circuit is used to synchronize the color signals at the screen and grid of a single gun color tube.

In one embodiment of the invention, the composite video signal is split into two parts by high and low pass filters, the brightness signal going through the low pass filter. Following the low pass filter is an alternating-current amplifier and the usual direct-current restorer circuit. An alternating-current gain control provides contrast adjustment. The chromaticity signal passes through the high pass filter and an alternating-current amplifier, and is added to the brightness signal and applied to the control grid of the color tube. Such addition can take place in the color tube itself by applying one of the two signals to the grid and the other to the cathode. An alternating-current gain control in the alternating-current amplifier provides saturation adjustment.

In another and simpler embodiment of this invention, instead of using high and low pass filters and separate amplifiers for the brightness and chromaticity signals, a signal filter which attenuates the brightness signal more than it does the chromaticity signal is used, and is followed by a single amplifier which feeds into the direct-current restorer which is connected to the control grid of the color tube.

This invention will now be described with reference to the annexed drawings, of which:

Throughout the drawings like reference characters refer to like elements in the various figures.

Figure 1:
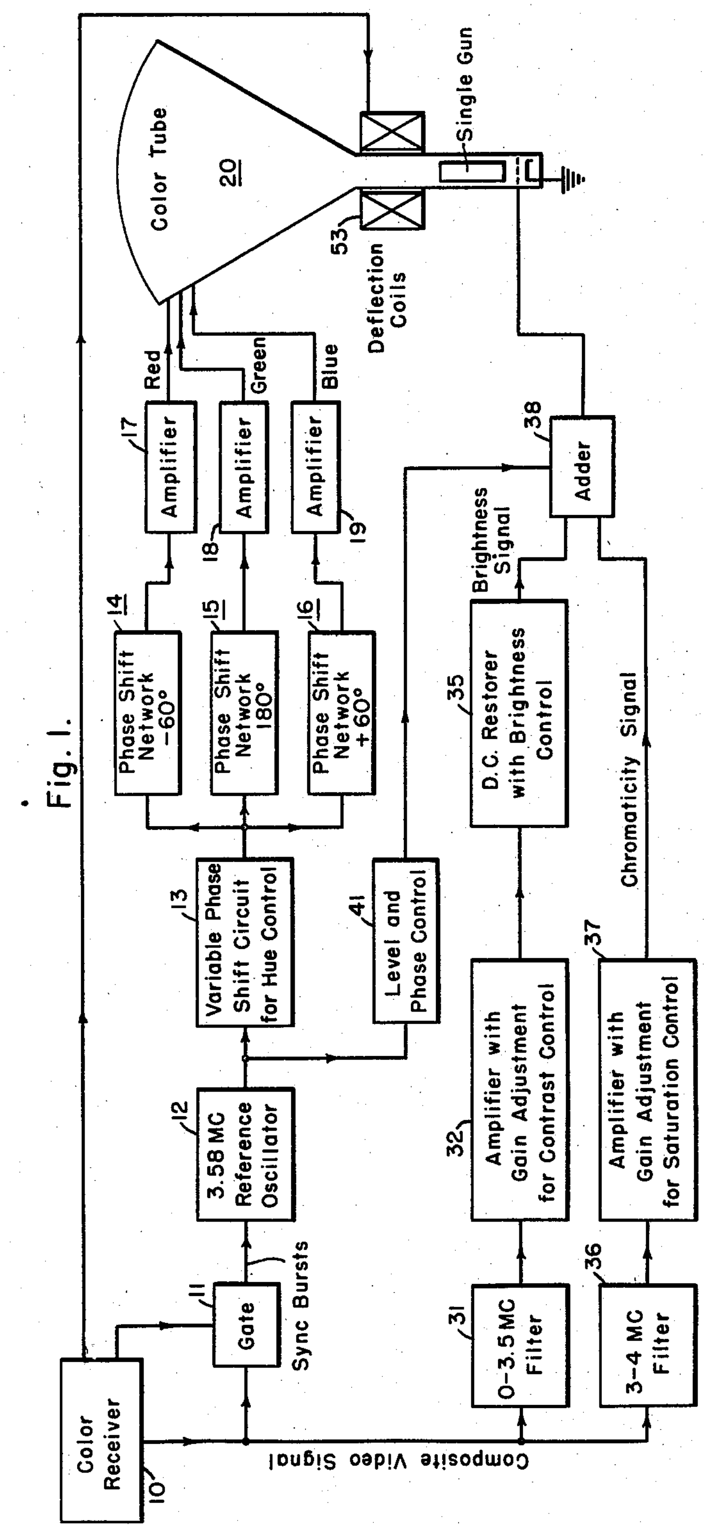
Figure 1 is a circuit schematic of one embodiment of the invention using a color tube of the type having three sets of color deflection plates or color deflection wires.

Referring now to Fig. 1 of the drawings, a receiver 10 which is conventional up through the video second detector, delivers a video signal to the gate 11 which is gated by the 15,750 cycles per second horizontal sync signals from the receiver, so that its output contains only the separated 3.58 megacycle burst signal which is received during horizontal blanking time and which is applied to the local 3.58 megacycle oscillator 12 to synchronize it with the corresponding oscillator at the transmitter.

The reference signal from the oscillator 12 is applied to the variable phase shift circuit 13 which is adjustable for varying the hue of a color picture.

Figure 4:
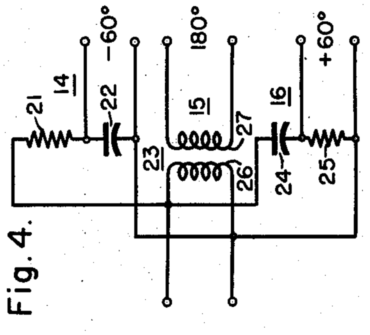
Fig. 4 is a circuit showing the details of the phase shift networks of Fig. 1.
Figure 3:
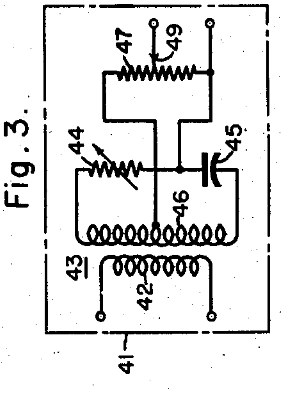
Fig. 3 is a circuit showing the details of the level and phase control of Fig. 1.

The variable phase shift circuit 13 may be of the type shown in Fig. 3 which is explained in more detail hereinafter. The signal from the circuit 13 is applied to the phase shift networks 14, 15 and 16 in the manner shown in Fig. 4, which provide three output signals which may be 120° apart in phase. In detail, the signal from the circuit 13 is applied across a resistor 21 and a condenser 22. By proper choice of the ratio of the reactance of condenser 22 to the resistance of the resistor 21, a signal phase shift of −60° is developed across the condenser 22. This signal is then applied to an amplifier 17. Similarly, the same signal from the circuit 13 is applied across a resistor 25 and a condenser 24 and by proper choice of the values of the condenser 24 and the resistor 25 a signal with a phase shift of +60° is developed across the condenser 24. The signal is then applied to an amplifier 19. The same signal from the circuit 13 is applied to the primary winding 26 of a transformer 23 and a signal having a phase shift of +180° is developed across the secondary winding 27 of the transformer. This signal is then applied to an amplifier 18. The signals from the amplifiers 17, 18, and 19, respectively, are applied to the control electrodes of the color tube 20 which may be of the single gun, deflection wire type shown in Fig. 9 or may be of the single gun, deflection plate type disclosed in the copending application of T. Miller, Serial No. 295,675, filed June 26, 1952.

The network 14 shifts the signal −60° in phase; the network 15 shifts the signal 180° in phase, and the network 16 shifts the signal +60° in phase. However, since the present NTSC specification consists of three primary colors which are not transmitted exactly 120° apart in phase, some modification of this angle may be required for optimum color rendition.

The low frequency components of the video signals are supplied through the 0–3.5 megacycle filter 31 into the amplifier 32 having a gain adjustment 34 (Fig. 2) and then into the direct-current restorer 35 which has a brightness adjustment.

The high frequency components of the video signals are supplied through the high pass filter 36 which passes a band of 3 to 4 megacycles, into the amplifier 37 which also has a gain adjustment 34.

Figure 10:
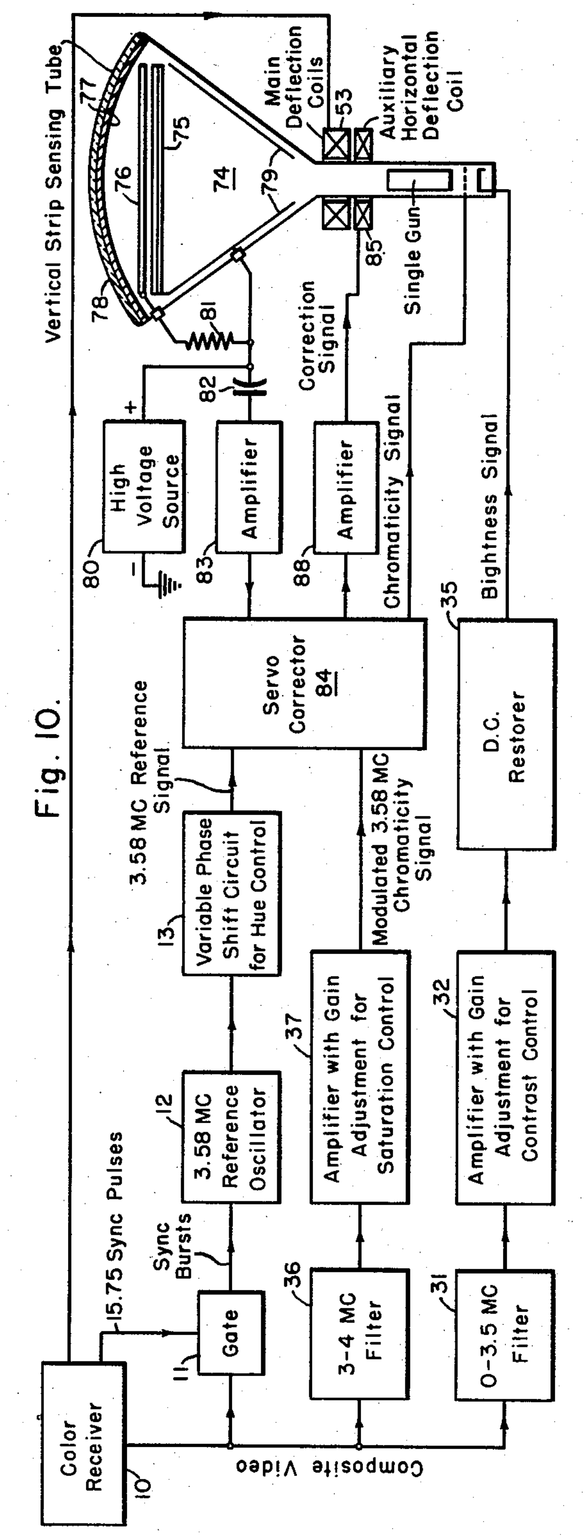
Fig. 10 is a circuit schematic similar to Fig. 1 but modified for use with a vertical strip sensing tube.

The outputs of the direct-current restorer 35 and the amplifier 37 are added in the adder 38 and applied to the control grid of the color tube 20. This addition can be accomplished in the color tube by supplying one output to the control grid and the other to the cathode as shown in Fig. 10. It is to be noted that the chromaticity portion of the NTSC color signals (roughly those frequencies between 3 and 4 megacycles) is not demodulated in any way before application to the grid of the color tube.

Figure 2:
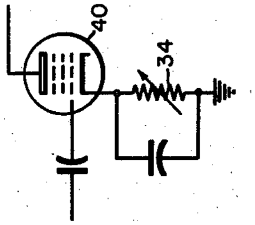
Fig. 2 is a circuit showing how the gain of the amplifiers of Fig. 1 can be adjusted.

Fig. 2 shows a conventional gain control which can be used in the amplifier 32 for contrast adjustment, and in the amplifier 37 for saturation adjustment. An amplifier tube 40 has the potentiometer 34 connected between its cathode and ground. This type of control is commonly used as a contrast control in television receiver circuits.

Due to the difference in efficiencies of different color phosphors, the tube 20 may not display white when a direct-current signal is applied to its grid. To correct for this, a 3.58 megacycle signal may be taken from the reference oscillator 12 and applied through the level and phase control 41 to the adder 38 for providing proper color balance. The details of this control are shown by Fig. 3. The signal from the reference oscillator is applied across the primary winding 42 of a transformer 43 which has the variable resistor 44 and capacitor 45 connected in series across its secondary winding 46. The mid-point of the secondary winding is connected to one end of the potentiometer 47, the other end of which is connected to the junction point of the resistor 44 and capacitor 45. The output signal is taken across the slider 49 of the potentiometer 47 and one of its ends. The variable resistor 44 provides phase adjustment, and the potentiometer 47 provides level adjustment.

In the circuit of Fig. 1, the red color control voltage from the amplifier 17 is applied to the red color control electrode of the picture tube 20 at the same time the red color signal is applied to the control grid of the tube. Likewise, the green color control voltage from the amplifier 18 is applied to the green color control electrode of the tube 20 at the same time the green color signal is applied to the grid of the tube. Likewise, the blue color control voltage from the amplifier 19 is applied to the blue color control electrode of the tube 20 at the same time the blue color signal is applied to its control grid.

Figure 5:
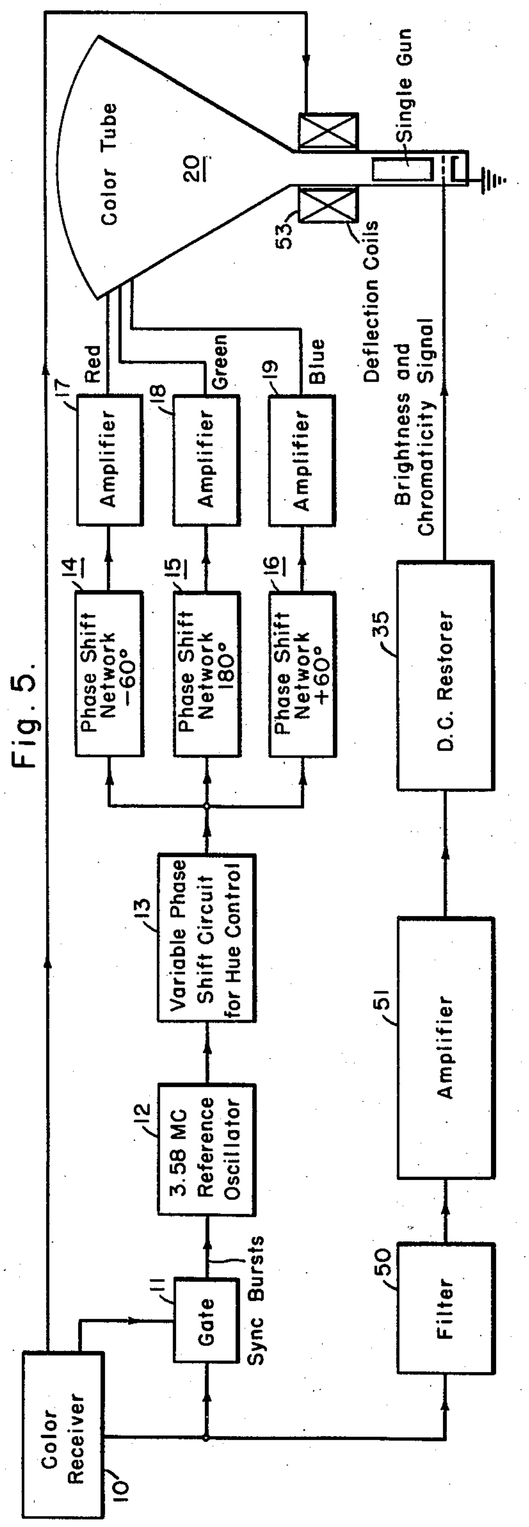
Fig. 5 is a circuit schematic showing a simpler embodiment of this invention in which separate channels for the brightness and chromaticity signals are not used.
Figure 6:
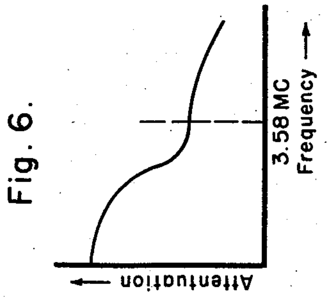
Fig. 6 is the response curve of the filter of Fig. 5.

Fig. 5 of the drawings illustrates a simplified circuit which is similar to Fig. 1 except that the single filter 50 having the attenuation characteristic shown by Fig. 6 is used instead of the filters 31 and 36 of Fig. 1; except that a single amplifier 51 is used instead of the amplifiers 32 and 37 of Fig. 1, and except that the adder of Fig. 1 is omitted. The filter 50 by attenuating the brightness signal more than it does the chromaticity signal as shown by Fig. 6, enables a filter, an amplifier and an adder to be omitted. The same result can be achieved by omitting the filter 50 and making the characteristics of the amplifier 51 such that there is more gain in the 3 megacycle to 4 megacycle region than in the 0 to 3 megacycle region. Except for the omitted components, and the different characteristic of the filter, the circuit of Fig. 5 is similar to that of Fig. 1 and operates in the same way.

The color tube 20 of Fig. 1 and Fig. 5, and the following figures would have the usual deflection coils 53.

Figure 7:
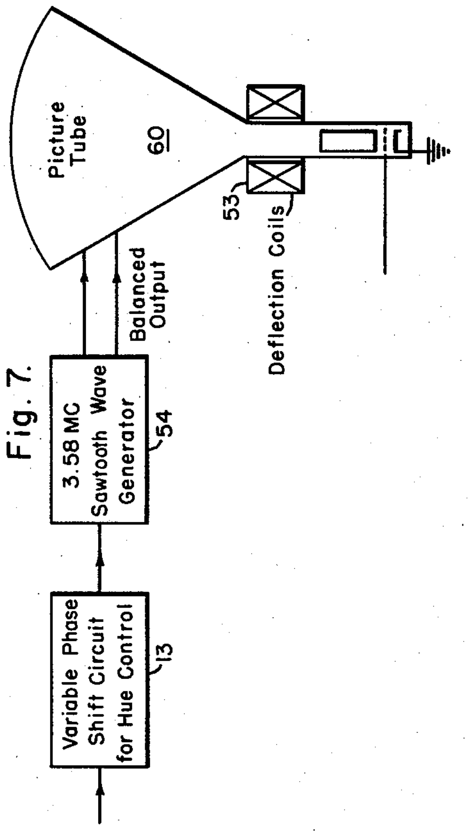
Fig. 7 is a circuit showing the deflection circuit of Fig. 1 or Fig. 5 modified for use with a color tube of the type having two sets of color deflection wires.
Figure 8:
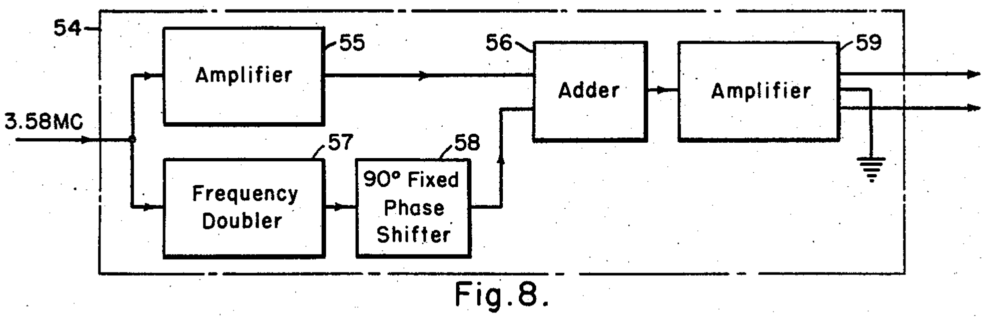
Fig. 8 is a circuit showing the details of the sawtooth wave generator of Fig. 7.

Fig. 7 illustrates how the circuits of Figs. 1 and 5 would be modified for use with a color deflection grid type color tube having two sets of deflection wires as described on pages 308–309 of the January, 1954 Proceedings of the Institute of Radio Engineers. The output of the variable phase shifter 13 is connected to the input of a 3.58 megacycle sawtooth wave generator 54 which delivers a balanced output to the deflection wires of the color tube 60. The details of the generator 54 are shown by Fig. 8. The 3.58 megacycle output from the phase shifter 13 is amplified by the amplifier 55 and supplied to the adder 56. The 3.58 megacycle signal has its frequency doubled in the doubler 57, and has its phase shifted 90° in the phase shifter 58 and is then supplied to the adder 56. The output of the adder is amplified by the amplifier 59 and supplied to the deflection wires of the tube 60. The grid circuit of the tube 60 may be that shown by Fig. 1 or Fig. 5. The center point of the generator 54 is grounded so that an isolation transformer (not shown) is required to isolate the deflection signal from the high voltage direct current.

The generator 54 delivers two deflection voltages to the deflection wires of the tube 60, a plus deflection voltage will cause the electron beam to be focused on the red phosphor strips of the screen of the tube 60. A minus deflection voltage will cause the electron beam to be focused on the blue phosphor strips of the screen. When there is no deflection voltage between the deflection wires of the tube 60, the electron beam will be on the green phosphor strips of the screen. Instead of using the sawtooth wave generator of Fig. 8, a sinusoidal deflection voltage of 3.58 megacycles can be used if a third harmonic (10.74 megacycles) blanking signal is applied to the grid or the cathode of the color tube.

Figure 9:
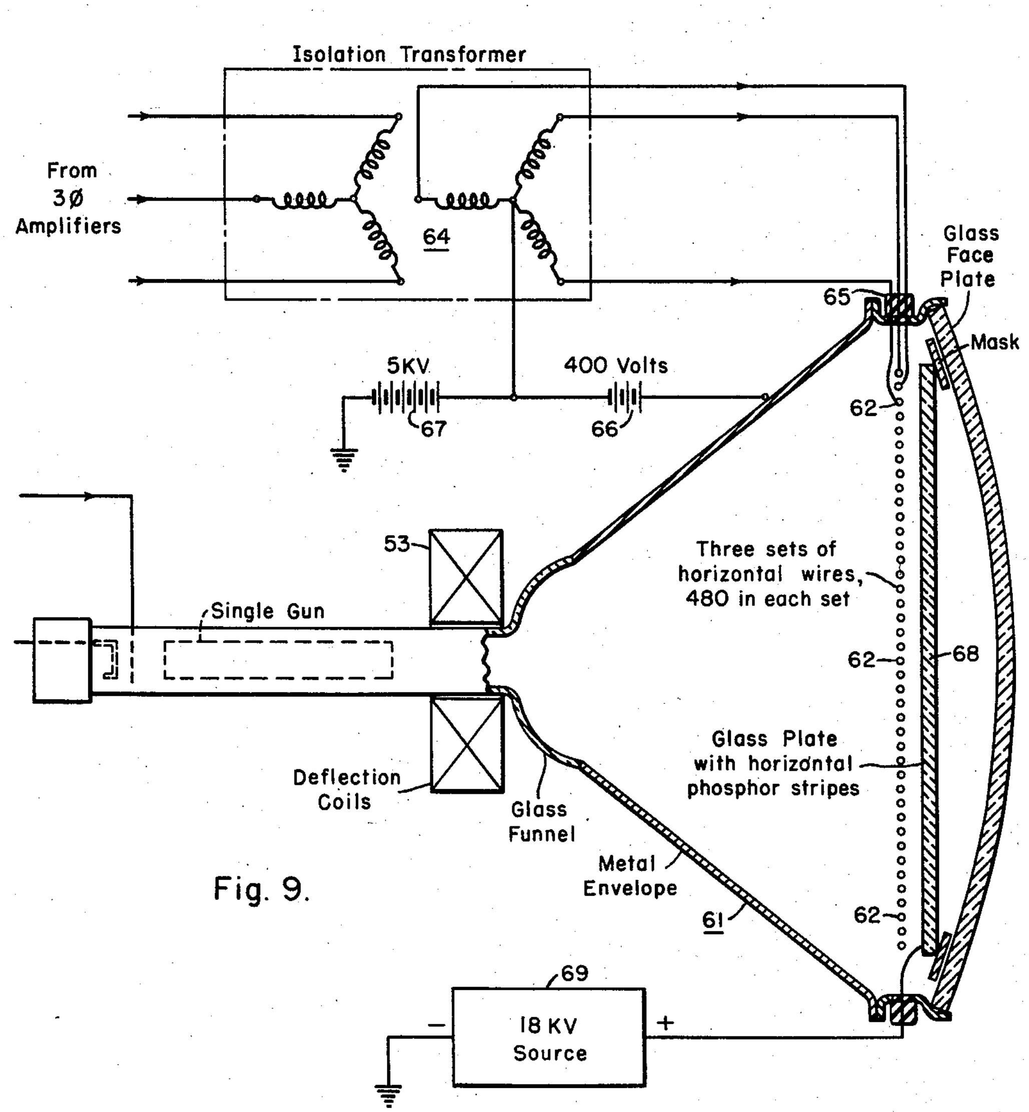
Fig. 9 is a circuit schematic showing in detail the application of control voltages to a three-phase focus grid color tube.

Fig. 9 illustrates in detail the application of deflection voltages to a three-phase focus grid deflection tube 61. The construction of this tube is similar to that of the tube of Fig. 7 except that there is one deflection wire for every phosphor strip instead of one deflection wire for every two phosphor strips. The first, fourth, seventh, tenth and so on, deflection wires 62 are electrically connected. The second, fifth, eighth, eleventh and so on, deflection wires 62 are electrically connected. The third, sixth, ninth, twelfth and so on, wires 62 are electrically connected. The output of the amplifiers 17, 18 and 19 of Fig. 1 or Fig. 5 would be connected to the input of the three-phase isolation transformer 64, the three-phase output of which would be connected through the three terminals of the bushing 65 to the first, second and third deflection wires 62. The primary and secondary windings of the transformer 64 are high Q resonant coils connected in either Y or Δ to bring the power factor to zero.

The metal envelope of the tube 61 is connected to the positive terminal of the 400 volt direct-current source 66, the negative terminal of which is connected to the junction point of the secondary windings of the transformer 64. The source 66 is connected in series with the 5 kilovolt direct-current source 67 to ground. The phosphor screen having horizontal phosphor strips on the glass plate 68 is connected to the positive terminal of the 18 kilovolt direct-current source 69, the negative terminal of which is grounded.

The transformer 64 delivers three sinusoidal voltages 120° apart in phase to the three sets of deflection wires. During one-third of a cycle, the electron beam will be focused on the red phosphor strips. One-third of a cycle later, the electron beam will be focused on the green strips, and a third of a cycle later, the beam will be focused on the blue strips. The combined chromaticity and brightness signals are supplied to the grid of the tube 61 as in Fig. 1 or Fig. 5, the color signals arriving at the grid of the picture tube at the same time that the appropriate deflection voltages are applied to the deflection wires.

The Kruper tube having grid control at the phosphor screen can be used with the circuits of Figs. 1 and 5. This tube is disclosed in the copending application of A. P. Kruper and C. H. Jones Serial No. 411,382, filed February 19, 1954, now Patent No. 2,862,141, issued November 25, 1958. The output of the amplifiers 17, 18 and 19 would be applied to the color control grid at the screen of this tube.

In the preceding description in connection with Figs. 1–9, this invention has been described as used with color tubes having color switching electrodes, three-phase voltages being applied to such electrodes. The invention can also be used with color tubes having no color switching electrodes but which use sensing signals for determining just where the electron beam is with respect to the phosphor lines. Such color tubes are known as sensing signal color tubes and are described in the copending application of A. B. Welch, Serial No. 381,067, filed September 18, 1953, now Patent No. 2,792,522, issued May 14, 1957, and in the copending application of C. H. Jones and G. W. Nagel, Serial No. 364,318, filed June 26, 1953, now abandoned.

Fig. 10 illustrates an embodiment of this invention using such a sensing tube 74 of the type disclosed in said Welch application. This tube has a phosphor color screen 75 and has a collecting electrode 76 between the screen 75 and the transparent shielding electrode 77 on the interior of the face plate 78. It has the second anode or shell which is in the form of a conductive coating on the inner surface of the envelope of the tube. A high voltage source 80 of the order of 15 kilovolts direct current, has its positive side connected to the shell 79 of the tube and its screen 75, and connected through the resistor 81 to the collecting electrode 76. The collecting electrode is also connected through the coupling capacitor 82 to the input of the tuned amplifier 83, the output of which is connected to the servo-corrector 84.

The electron beam of the tube 74 passes the red, green and blue phosphor strips in rapid sequence. The frequency of the chromaticity signal applied to the grid of the tube is identical to the frequency at which groups of color strips are crossed by the electron beam. A voltage pulse will be generated in the collecting electrode 76 each time the electron beam moves across a space between a pair of color groups, and this pulse is applied at approximately a 3.58 megacycle rate through the amplifier 83 to the servo-corrector 84 in which it is compared in phase with the 3.58 megacycle reference signal, and the output of a phase comparator is applied through the amplifier 88 to the auxiliary horizontal deflection coil 85 to speed up or slow down the horizontal sweep to maintain synchronism.

With the present NTSC signal, the angular separation between green and red is 137°; the angular separation between red and blue is 116°, and the angular separation between blue and green is 107°. For this reason, in a vertical strip type tube, the space separation between the color lines could be in the same ratio. For example, the distance from the center of the green line to the center of the red line might be 14 mils, from the center of the red line to the center of the blue line 12 mils, and from the center of the blue line to the center of the green line 11 mils.

Figure 11:
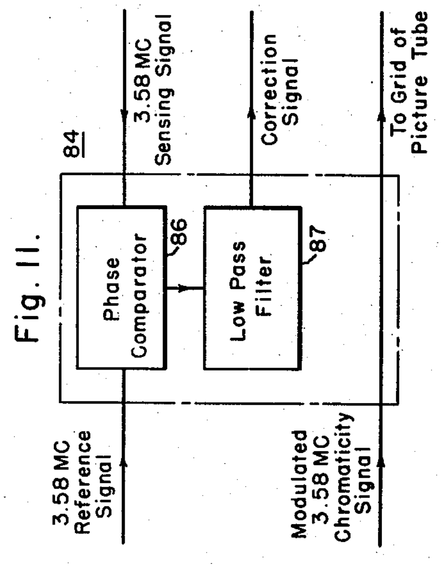
Fig. 11 is a circuit showing one form of a servo-corrector which can be used in the circuit of Fig. 10.

Fig. 11 illustrates one form of servo-corrector that can be used in the circuit of Fig. 10. The sensing signal from the collecting electrode 76 of the color tube is compared in the phase comparator 86 with the 3.58 megacycle reference signal. The output of the phase comparator is supplied through the low pass filter 87 to the auxiliary horizontal deflection coil 85 of Fig. 10 for speeding up or slowing down the horizontal sweep to maintain synchronism. This type of circuit is simple but is only suitable for use with a color tube having 190 groups of phosphor strips having a low horizontal resolution.

Figure 12:
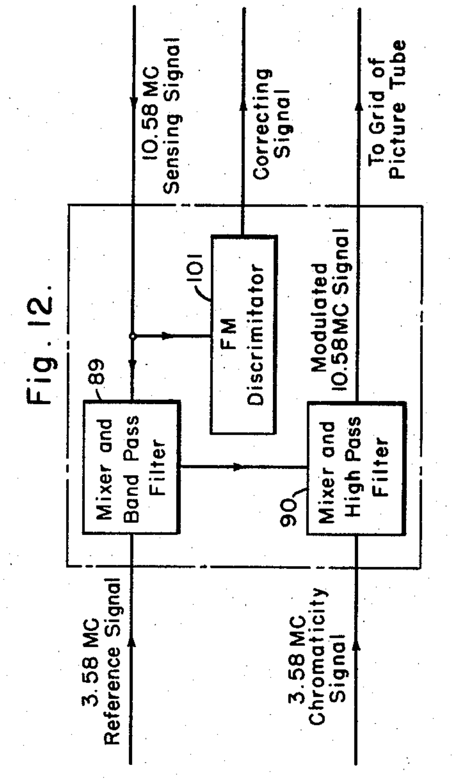
Fig. 12 is a circuit showing another form of servo-corrector which can be used in the circuit of Fig. 10.

Fig. 12 shows a servo-corrector circuit which can be used in the circuit of Fig. 10 with a color tube employing approximately 560 groups of color strips. (This assumes that the visible portion of the horizontal sweep occurs in approximately 53 microseconds.) With this type of color tube, the sensing signal will have a frequency of approximately 10.58 megacycles. This frequency can approximately be maintained by applying the sensing signal to the frequency modulation discriminator 101 and using the output of the discriminator to correct the horizontal sweep speed. The sensing signal is also mixed in the mixer and band pass filter 89 with the 3.58 megacycle reference signal to obtain a 7.0 megacycle output. The bandpass filter eliminates the unwanted 3.58 megacycle, the unwanted 10.58 megacycle and the unwanted 14.6 megacycle signals which are also produced as a result of the mixing action. The 7.0 megacycle signal which comes out of the mixer-filter 89 is mixed in the mixer and high pass filter 90 with the 3.58 megacycle chromaticity signal to produce a 10.58 megacycle chromaticity signal. Again a filter is used to remove the undesired frequencies. This 10.58 megacycle chromaticity signal is applied to the grid of the picture tube. With this type of circuit the correction of the horizontal sweep does not have to be very good and may not be necessary at all because if the beam should sweep too fast, the sensing signal from the screen of the color tube will be slightly higher than the 10.58 megacycle signal which will result in an output from the mixer slightly greater than 7.0 megacycles. This in turn, produces an output from the second mixer which is slightly greater than 10.58 megacycles and identical in frequency with that obtained from the screen of the color tube. Hence, when the beam sweeps rapidly across the screen of the tube, the base frequency of the chromaticity signal also increases. Conversely, when the beam sweeps more slowly across the screen, the base chromaticity frequency applied to the grid of the color tube is correspondingly reduced. Thus, the frequency modulation discriminator 101 and its lead to the auxiliary deflection coil may be omitted.

Figure 13:
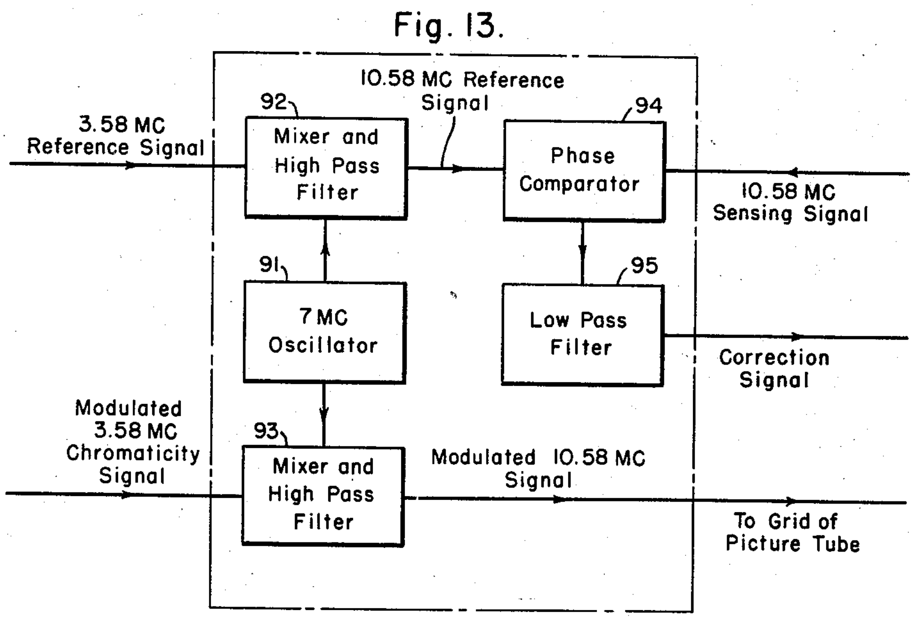
Fig. 13 is a circuit showing another form of servo-corrector which can be used in the circuit of Fig. 10.

Fig. 13 illustrates another type of servo-corrector which can be used with a high definition color tube. This circuit contains a local oscillator 91 of approximately 7.0 megacycles which frequency need not accurately be maintained. The oscillator 91 feeds two mixer-filters 92 and 93, the filters being high pass. The mixer-filter 93 combines the 7.0 megacycle fixed frequency from the oscillator 91 with the 3.58 megacycle chromaticity signal to obtain a 10.58 megacycle chromaticity signal which is applied to the grid of the color tube. The mixer-filter 92 combines the 7.0 megacycle signal with the 3.58 megacycle reference signal to provide a 10.58 megacycle reference signal. This latter signal is then compared in phase in the phase comparator 94 with the signal from the collecting electrode 76 of the color tube. The output of the phase comparator is then passed through the low pass filter 95 and then supplied to the auxiliary horizontal deflection coil to synchronize the horizontal sweep with the chromaticity signals.

Figure 14:
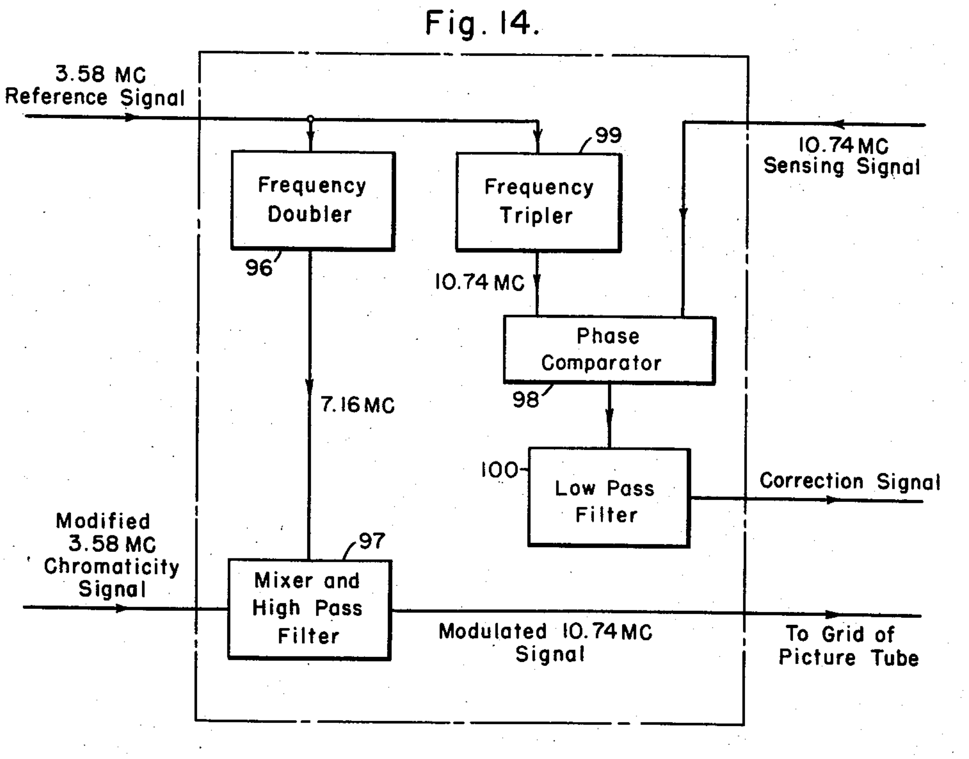
Fig. 14 is a circuit showing still another form of servo-corrector which can be used in the circuit of Fig. 10.

Fig. 14 illustrates another form of servo-corrector which can be used with a high definition color tube. In this circuit the second harmonic of the 3.58 megacycle reference signal is obtained from the frequency doubler 96 and is mixed in the mixer high-pass filter 97 to derive a 10.74 megacycle signal which is fed to the control grid of the color tube. This tube is assumed to have 575 groups of vertical color stripes so that the output sensing signal from the collecting electrode of the tube is approximately 10.74 megacycles. This sensing signal is compared in phase in the phase comparator 98 with the third harmonic of the 3.58 megacycle reference signal from the frequency tripler 99, and the output of the phase comparator is passed through the low pass filter 100 and supplied to the auxiliary horizontal deflection coil to correct the horizontal sweep in order to maintain the desired synchronization.

Instead of using a color tube of the Welch type having an internal collecting electrode for providing the sensing signals described in the foregoing in connection with Figs. 10–12, a color tube such as is disclosed in said Jones-Nagel application can be used. In this type of color tube, the phosphor strips provide the sensing signals used in this invention for synchronization.

While I have shown by invention in several forms, it will be obvious to those skilled in the art that it is not so limited but is susceptible of various other changes and modifications, without departing from the spirit and scope thereof.

I claim as my invention:

1. In a color television receiver having means providing a composite video signal including a color subcarrier and horizontal sync pulses, the combination of a gate connected to said means for receiving sync bursts and horizontal sync pulses therefrom, a reference oscillator connected to said gate, said sync pulses gating said gate to pass separated sync bursts to said oscillator, a color tube having a fluorescent screen for producing a polychromatic image, said screen having a plurality of groups of fluorescent lines for producing primary color components of said image, said fluorescent lines being arranged on said screen in a continuous color sequence, said tube having a control electrode and a cathode, filter means directly connected between said means providing a composite video signal and said control electrode of said color tube for adjusting the level of the chromaticity portion of the frequency spectrum of said composite video signal with respect to the brightness portion, means for sweeping said screen with the electron beam from said cathode, and means using the output of said oscillator for synchronizing the sweeping of said groups of fluorescent lines with the appearance of chromaticity signals between said control electrode and cathode to cause said fluorescent lines to be excited by the electron beam in a continuous color sequence.

2. The invention claimed in claim 1, in which the color tube has color switching electrodes, and in which the means using the output of the oscillator comprises phase shift circuits connected to said oscillator and to said switching electrodes.

3. The invention claimed in claim 2, in which an adjustable phase shift circuit is connected between the oscillator and said phase shift circuits for varying the hue of a picture reproduced by said color tube.

4. The invention claimed in claim 1, in which the color tube is a signal sensing type tube having sensing signal means, and in which the means using the output of the oscillator comprises means for comparing the sensing signal from the sensing signal means with the signal from the oscillator.

5. The invention claimed in claim 4, in which the last mentioned means comprises means for comparing the phase of the sensing signal with the signal from the oscillator.

6. In a color television receiver circuit having means providing a composite video signal including a color subcarrier and horizontal sync pulses, the combination of a gate connected to said means, a reference oscillator connected to said gate, said sync pulses gating said gate to pass separated burst signals to said oscillator, a color tube having a fluorescent screen for producing a polychromatic image, said screen having a plurality of groups of fluorescent lines arranged on said screen in a continuous color sequence, said color tube having color switching electrodes and a control electrode, filter means directly connected between said means providing a composite video signal and said control electrode of said color tube for adjusting the level of the chromaticity portion of the frequency spectrum of said composite video signal with respect to the brightness portion, and means for changing the output of said oscillator to a multiple phase output and for applying the multiple phase output to said switching electrodes in synchronism with the chromaticity signals appearing at the control electrode of said color tube.

7. The invention claimed in claim 6, in which an adjustable phase shift circuit is connected between the oscillator and the means for changing the output of the oscillator to a multiple phase output, for varying the hue of a color picture reproduced by said tube.

8. The invention claimed in claim 6, in which the color tube is a color deflection grid type tube having two sets of deflection wires, and in which the means for changing the output of the oscillator to a multiple phase output includes an alternating-current generator.

9. The invention claimed in claim 8, in which the generator is a sawtooth wave generator.

10. The invention claimed in claim 9, in which an adjustable phase shift circuit is connected between the oscillator and the means for changing the output of the oscillator to a multiple phase output, for varying the hue of a picture reproduced by said tube.

11. In a color television receiver circuit having means providing a composite video signal including a color subcarrier and horizontal sync pulses, the combination of a gate connected to said means, an oscillator connected to said gate, said sync pulses gating said gate to pass separated burst signals to said oscillator, a color tube having a fluorescent screen for producing a polychromatic image, said screen having a plurality of groups of fluorescent lines arranged on said screen in a continuous color sequence, said color tube having color switching electrodes and a control electrode, means for directly applying the brightness and chromaticity signal components of said composite video signal to said control electrode comprising a low pass filter connected to said first-mentioned means for adjusting the level of the brightness signal component of the composite video signal, a first amplifier connected to said filter, a direct-current restorer connected to said amplifier, a high pass filter connected to said first-mentioned means for adjusting the level of the chromaticity signal component of the composite video signal, a second amplifier connected to said high pass filter, and means for adding the outputs of said direct-current restorer and said second amplifier and for applying the sum to said control electrode, and means for changing the output of said oscillator to a multiple phase output and for applying the multiple phase output to said switching electrodes in synchronism with the appearance of the chromaticity signal component of the composite video signal at said control electrode.

12. The invention claimed in claim 11, in which an adjustable phase shift circuit is connected between the oscillator and the means for changing the output of the oscillator to a multiple phase output, for varying the hue of a color picture reproduced by said tube.

13. The invention claimed in claim 12, in which means is provided for adjusting the gain of said first amplifier for adjusting the contrast of a picture reproduced by said tube, and means is provided for adjusting the gain of said second amplifier for adjusting the saturation of the colors in a picture reproduced by said tube.

14. The invention claimed in claim 11, in which the color tube is a color deflection grid type tube having two sets of deflection wires, and in which the means for changing the output of the oscillator to a multiple phase output includes an alternating-current generator.

15. The invention claimed in claim 14, in which the generator is a sawtooth wave generator.

16. The invention claimed in claim 15, in which an adjustable phase shift circuit is connected between the generator and the means for changing the output of the oscillator to a multiple phase output, for adjusting the hue of a color picture reproduced by said tube.

17. The invention claimed in claim 16, in which means is provided for adjusting the gain of said first amplifier for adjusting the contrast of a picture reproduced by said tube, and in which means is provided for adjusting the gain of said second amplifier for adjusting the saturation of the colors reproduced by said tube.

18. The invention claimed in claim 11, in which means is provided for applying a correction signal from said oscillator to said control electrode.

19. The invention claimed in claim 6, in which means is provided for applying a correction signal from said oscillator to said control electrode.

20. The invention claimed in claim 1, in which means is provided for applying a correction signal from said oscillator to said control electrode.

21. In a color television receiver circuit having means for providing a composite video signal and horizontal sync pulses, the combination of a gate connected to said means, an oscillator connected to said gate, said sync pulses gating said gate to pass separated burst signals to said oscillator, a color tube having a fluorescent screen for producing a polychromatic image, said screen having a plurality of groups of fluorescent lines arranged on said screen in a continuous color sequence, said color tube having color switching electrodes and a control electrode, means for directly applying the brightness and chromaticity signal components of said composite video signal to said control electrode comprising a filter connected to said first-mentioned means for adjusting the level of the chromaticity signal component of said composite video signal with respect to the brightness signal component, said filter attenuating the brightness signal component more than it does the chromaticity signal component, an amplifier connected to said filter, and a direct-current restorer connected to said amplifier and to said control electrode, and means for changing the output of said oscillator to a multiple phase output and for applying the multiple phase output to said switching electrodes in synchronism with the chromaticity signal component of said composite video signal appearing at the control electrode of said color tube.

22. The invention claimed in claim 21, in which an adjustable phase shift circuit is connected between said oscillator and said means for changing the output of said oscillator to a multiple phase output, for adjusting the hue of a color picture reproduced by said tube.

23. The invention claimed in claim 21, in which the color tube is a color deflection grid type tube having two sets of deflection wires, and in which the means for changing the output of the oscillator to a multiple phase output including an alternating-current generator.

24. The invention claimed in claim 23, in which the generator is a sawtooth wave generator.

25. The invention claimed in claim 21, in which means is provided for applying a correction signal from said oscillator to said control electrode.

26. In a color television receiver having means providing a composite video signal including a color subcarrier and sync pulses, a reference oscillator, means using said sync pulses for adjusting the frequency of said oscillator, a color tube having a fluorescent screen for producing a polychromatic image, said screen having a plurality of groups of fluorescent lines for producing monochromatic components of said image, said fluorescent lines being arranged on said screen in a continuous color sequence, said tube having a control electrode and a cathode, means for sweeping said screen with the electron beam from said cathode, means deriving sensing signals from the sweeping of said screen by said beam, means for directly applying the brightness and chromaticity signal components of said composite video signal to said control electrode comprising a filter connected to said first-mentioned means for adjusting the level of the chromaticity signal component of said composite video signal with respect to the brightness signal component, and means using the output signals from said oscillator and said sensing signals for synchronizing the sweeping of said groups of fluorescent lines with the appearance of the chromaticity signal component of said composite video signal at said control electrode to cause said fluorescent lines to be excited by the electron beam in a continuous color sequence.

27. The invention claimed in claim 26, in which the last-mentioned means comprises a phase comparator to which the output of the oscillator and the sensing signals are applied, and auxiliary beam deflection means at said tube connected to said comparator.

28. The invention claimed in claim 26, in which the last-mentioned means comprises a mixer and band pass filter to which the output signals of said oscillator and the sensing signals are applied, a mixer and high pass filter between said control electrode and said filter, said filter being connected to said mixer and band pass filter, a frequency modulation discriminator to which said sensing signals are applied, and auxiliary beam deflection means at said tube connected to said discriminator.

29. The invention claimed in claim 26, in which the last-mentioned means comprises a mixer and band pass filter to which the output of the oscillator and the sensing signals are applied, and a mixer and high pass filter between said control electrode and said filter, said filter being connected to said mixer and band pass filter.

30. The invention claimed in claim 26, in which the last-mentioned means comprises a mixer and high pass filter connected to said oscillator, a phase comparator to which the output of said mixer and high pass filter is applied and to which the sensing signals are applied, a mixer and high pass filter between said control electrode and said level adjusting filter, an oscillator between said first-mentioned and said second-mentioned mixers and filters, a low pass filter connected to the output of said comparator, and auxiliary beam deflection means at said tube connected to said low pass filter.

31. The invention claimed in claim 26, in which the last-mentioned means comprises a frequency doubler and a frequency tripler connected to said oscillator, a mixer and high pass filter connected between said control electrode and said filter, said filter being connected to said doubler, a phase comparator connected to receive the output of said tripler and said sensing signals, a low pass filter connected to said comparator, and auxiliary beam deflection means at said tube connected to said low pass filter.

References Cited in the file of this patent

UNITED STATES PATENTS

| | | |
|---|---|---|
| 2,680,147 | Rhodes | June 1, 1954 |
| 2,681,381 | Creamer | June 15, 1954 |
| 2,705,257 | Lawrence | Mar. 29, 1955 |
| 2,744,952 | Lawrence | May 8, 1956 |
| 2,745,899 | Maher | May 15, 1956 |
| 2,759,993 | Loughlin | Aug. 21, 1956 |
| 2,763,715 | Fromm | Sept. 18, 1956 |